United States Patent Office 2,778,586
Patented Jan. 22, 1957

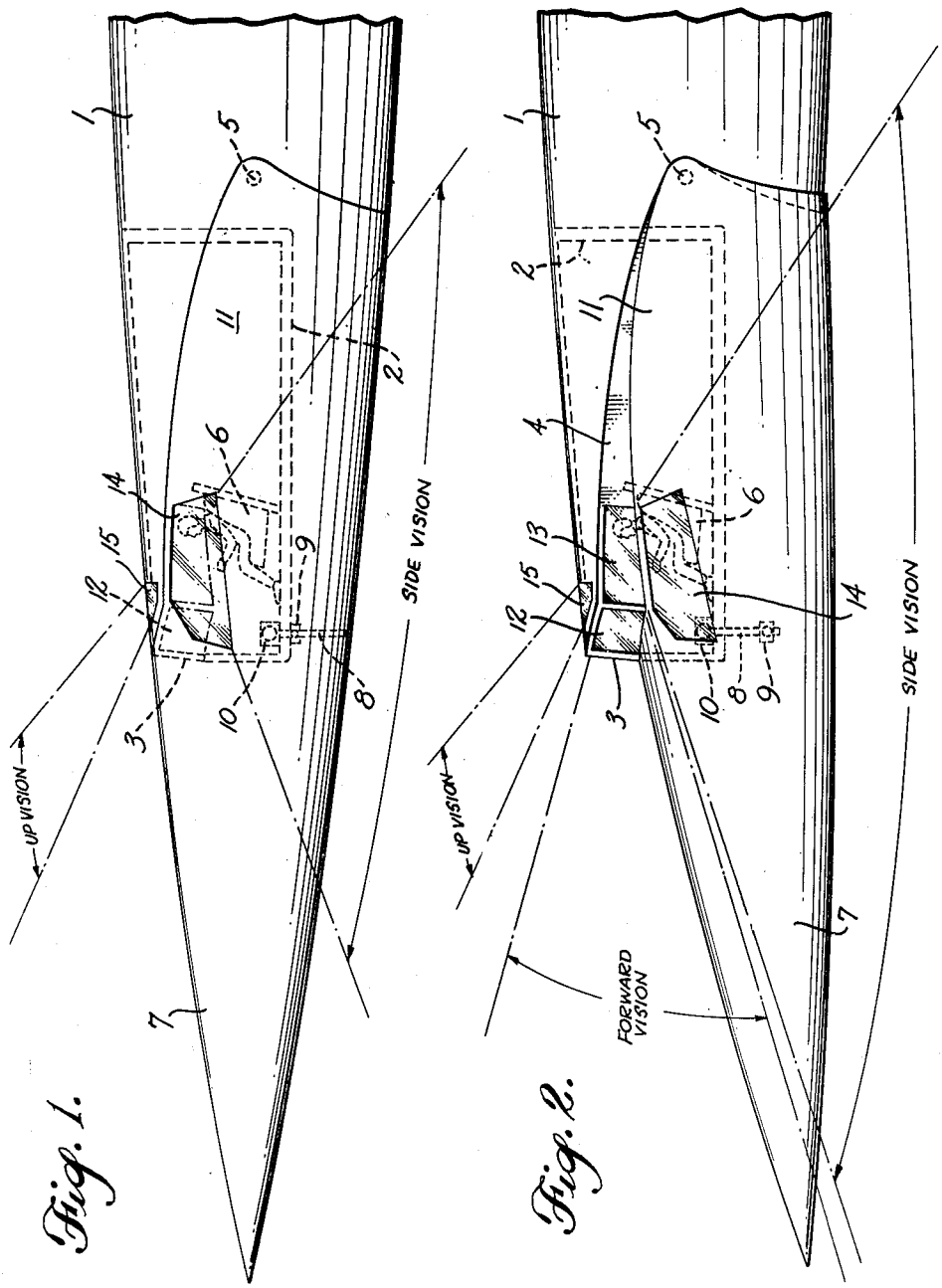

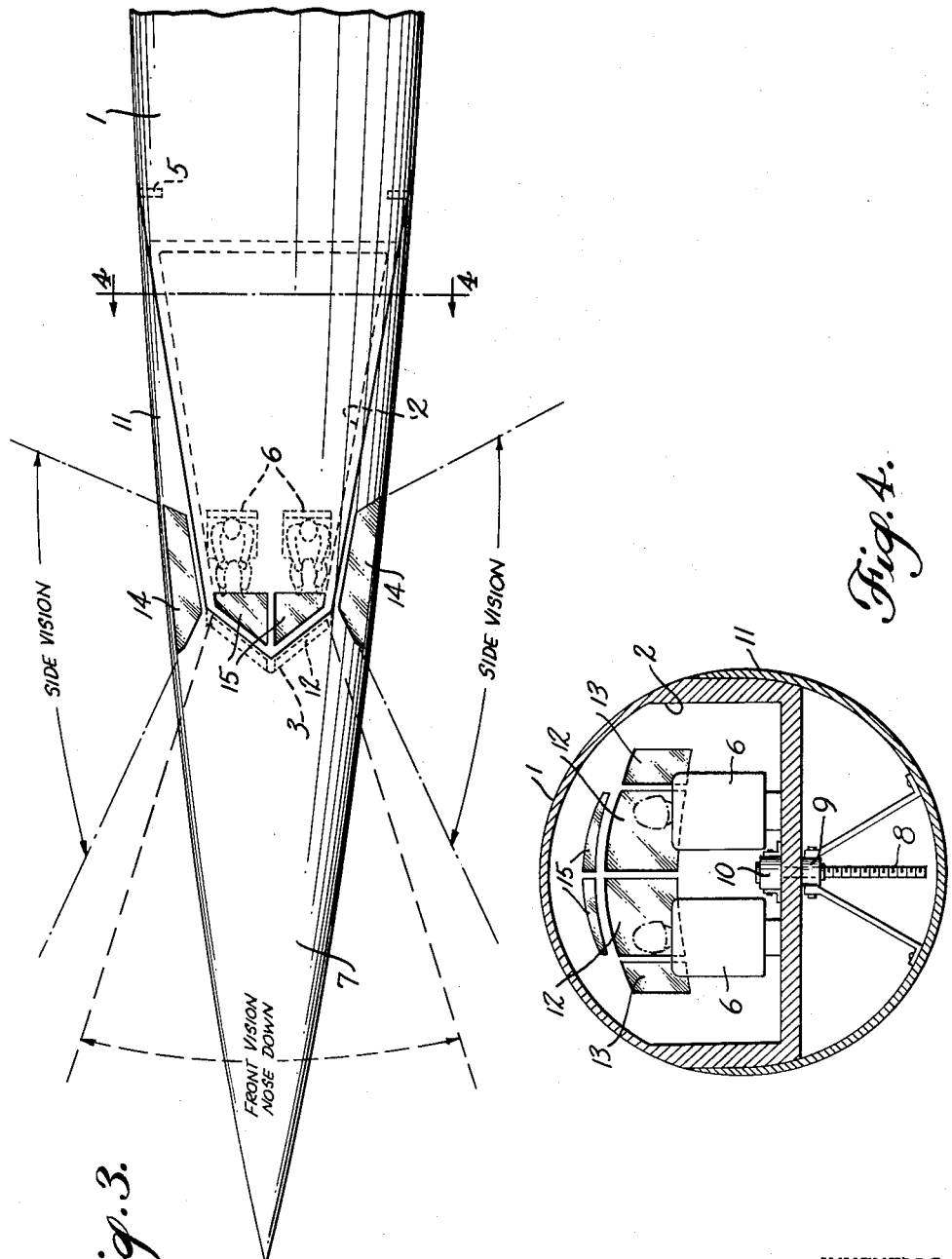

2,778,586

SUPERSONIC PILOTED AIRPLANE WITH ADJUSTABLE NOSE

Gilbert A. Nyerges and Maurice F. Muzzy, Seattle, Wash., assignors to Boeing Airplane Company, Seattle, Wash., a corporation of Delaware Application May 2, 1955, Serial No. 505,372

8 Claims. (Cl. 244—120)

Supersonic airplanes must, in the highest degree possible, be of correct streamline shape and extremely smooth as to exterior contour. Any break in the continuity and smoothness of the exterior contour, particularly in the vicinity of the nose, will create turbulence, drag, excessive heating, and other difficulties. The protuberance or canopy employed about the pilot's station in subsonic airplanes, in order to afford the pilot satisfactory vision ahead and somewhat downwardly past the nose, is not permissible in supersonic airplanes. In the past, such supersonic airplanes have had overhead "eyebrow" windows, and in some cases side windows, primarily for admission of light to the cockpit, located above and to the sides of the pilot's station, but the pilot was completely blind in accomplishing a landing. Because of the high speed and blindness of landings, it has heretofore been considered necessary that a nurse airplane fly close to the landing supersonic airplane, and through radio communication advise the latter's pilot what to do and when. In particular the pilot of the supersonic airplane was unable to see the ground ahead of him, and so could not of his own judgment determine when or where to touch down. This lack of adequate vision, ahead and somewhat downwardly, has been a very considerable handicap to the pilots of such supersonic airplanes.

To overcome such lack of vision, various proposals have been advanced, but in most cases these solutions have themselves entailed further problems of weight, of complication of structure, of space, for there is little available, and the like. The present invention provides a supersonic airplane in which during supersonic flight (which always occurs at high altitudes, and during which visibility of the ground is unimportant), the streamline shape of the fuselage is completed by a separate and adjustably positioned nose that, in its high-speed flight position, constitutes a substantially unbroken, wholly smooth, forward continuation of the fuselage structure, but which nose, for purposes of landing when the airplane is at a lower speed, can be moved—usually dropped with respect to the fuselage structure—into a low-speed flight position, wherein it uncovers forward windows in the pilot's cabin to an extent that the pilot can see forwardly and somewhat downwardly past the nose, and thus has good vision for effecting a landing on the basis of his own judgment.

In line with the general object just expressed, by which the ultimate object of an aerodynamically clean ogive nose without protuberances is provided for supersonic flight, yet adequate vision is provided for landing and take-off, the following additional objects are achieved by the present invention.

An abundance of cockpit lighting is provided by means of side windows and eyebrow windows at all times; the pilot's cabin is an integral part of the fuselage structure, and is fixed therein, wherefore all controls in the cabin run uninterruptedly, and without any necessity of flexible connections, to the elements which they are to control; ejection apparatus is readily installed and satisfactorily operable if needed; two occupants of the cabin may be seated side by side if desired without appreciably affecting the frontal area; the pilot's cabin or cockpit may readily be pressurized to whatever extent necessary; there is no need for special windshield cooling equipment as is otherwise required for supersonic flight where the windshield or forwardly-facing window is opposed in some measure to the relative airflow; the construction is simple and of wholly adequate strength under all conditions; the aerodynamic surfaces for subsonic speeds with the nose in the low-speed flight condition are satisfactory, if not ideal; and the pilot's vision through the forward window or windshield is more or less normal to the surface of the glass rather than at a steep angle of incidence to the same, so giving improved vision, with minimum aberration.

With such objects in mind, and others as will be understood more fully as this specification progresses, the present invention comprises the improved supersonic airplane which is shown in the accompanying drawings, and which is described herein, in a representative embodiment, and the principles whereof will be defined by the claims at the end of this specification.

It may be mentioned at the outset that structural details are illustrated herein to the minimum, inasmuch as such structural details may be varied as the design or other considerations require. While reference is made herein to high-speed flight conditions and to low-speed flight conditions, it will be understood that these terms are mutually relative, and that "high-speed flight conditions" means, in general, conditions suited to supersonic flight, whereas the term "low-speed flight conditions" refers generally to conditions suited to speeds which are subsonic, but which under other circumstances or in other airplanes might themselves be considered high-speed flight conditions. Also, while reference is made herein to a piloted airplane, the same conditions will prevail in any piloted aerodynamic body, hence, the term "airplane" is to be understod as used in the broadest sense.

Figure 1 is a side elevational view of the forward portion of the fuselage and associated parts, all in the high-speed flight position, and Figure 2 is a similar view with parts in the low-speed flight position.

Figure 3 is a top plan view corresponding generally to Figure 1, and Figure 4 is, in general, a transverse cross-sectional view on the line 4—4 of Figure 3.

The fuselage structure 1 is shown only in its forward portion, and includes a pilot's cabin 2 which terminates at a rather abrupt forward wall, designated 3, just ahead of the pilot's station 6. This wall 3 is generally upright, and incorporates a forward window or windshield 12. In addition, the side walls of the fuselage in its forward portion would be somewhat relieved or cut away as is indicated in Figure 2 at 4. It is preferred that the surfaces at 3 be formed as arcuate surfaces of revolution about an axis located at 5 well to the rear of the pilot's station 6, and that the surfaces at 4 be also formed as surfaces of revolution about the same axis. Incidentally, it will be noted that there are two pilots' positions placed side by side, which in many cases may be desirable, and they may be treated as a composite pilot's station, for one may be occupied by the pilot and another by the co-pilot or engineer officer or observer.

The fuselage 1 is completed in its forward portion, ahead of the wall 3, by an ogival nose 7 which is supported from the fuselage, but for movement with respect to the fuselage. Preferably the nose 7 has rearwardly directed cheeks 11 at each side, which are pivotally connected about the axis 5 to the fuselage in such a manner that the forward tip or nose may drop downwardly from the high-speed flight position of Figure 1 to the low-speed flight position of Figure 2. A screw 8 operating in a nut 9 (see Figure 4) and operated by means such, for instance, as a motor 10 within the pilot's cabin 2, is representative of any suitable means to effect movement of the nose between these two positions. The nose, with its cheeks 11, complements the contours of the fuselage to constitute an exteriorly smooth, substantially unbroken streamline shape. Any interruption where the cheeks at the lower rear portion adjoin the fuselage is so slight as to be negligible, and even so, can be minimized by proper relative shaping of the parts, and by flexible fairing. By forming the wall 3 and the relieved surfaces 4 as surfaces of revolution about the axis 5, and complementally forming the nose and cheeks, no gap is left in any position of the nose, and the nose and fuselage complementally define a smooth ogive when the nose is in the high-speed flight position. While a pivotal support for the nose is preferred, displacement of the nose relative to the fuselage structure otherwise than pivotally is quite possible. When the nose is pivotally mounted, the pivot axis should be well to the rear of the pilot's station 6, so that but slight angular departure of the nose from its high-speed flight position will unmask the windshield 12.

The transparent window or windshield 12 in the forward wall 3, is so located with relation to the line of vision of a pilot in the pilot's station 6, as to afford forward vision to the pilot, and preferably vision somewhat downwardly, provided nothing ahead of the window eclipses it or masks such vision. In addition, the relieved sides 4 have windows 13 and the cheeks 11 are also provided with windows 14, which register with the windows 13, or alternatively unmask the latter.

When the airplane is prepared for supersonic flight, the nose 7 is drawn upwardly until it constitutes a smooth, substantially unbroken, forward continuation of the fuselage structure 1, and its exterior constitutes a smooth, unbroken surface with respect to the surface of the fuselage. Preferably in this position, the nose 7 and the fuselage 1 are precisely coaxial. There is no break in the surfaces at the wall 3 because this wall is formed substantially on a surface of revolution about the axis 5, and the same is true as to the cheeks 11, and their juncture with the wall 4 and the exterior surface of the fuselage structure. However, in this high-speed flight position of the nose the windows 12 are eclipsed, as seen in Figure 1, and the pilot has substantially no vision ahead, although he is provided with the eyebrow windows 15, which afford him upward vision as indicated, and he also has the side windows 13 and 14 in their registering position, which affords him a certain amount of side vision and some down and forward vision to the side, inadequate, however, to enable a proper landing to be made. When the airplane is being made ready for a landing, and its speed has dropped to a subsonic value, the nose 7 may be dropped, thus uncovering the windows 12, so that now the pilot is afforded directly forward vision, as indicated in Figure 2, and because the nose is dropped below his line of vision, he is also afforded adequate downward vision. He has no need to see directly downwardly because the landing speeds of such airplanes are quite high, and he, therefore, must see the ground well ahead rather than closely beneath him.

In the position of parts shown in Figure 2, it is evident that there is somewhat of a protuberance, but because of the lowered speed of the airplane this protuberance is not objectionable, and is acceptably clean aerodynamically for subsonic flight.

It will be observed that the pilot's cabin 2 is at all times a rigid integral part of the fuselage structure, wherefore controls and the like may extend unbrokenly from within the pilot's cabin to the elements they are to control. They do not have to extend past a pivot axis, for the pilot's cabin is not itself mounted in the nose which droops. The cabin can be pressurized, and ordinarily would be. It is shielded by the nose from excessive heating, and the cooling problem is much lessened by this fact, and by the fact that there are no protuberances to serve as focal points for heating. Ejection apparatus for the pilot may be installed and will function satisfactorily, as much so as if there were no movable part of the fuselage. When the nose is lowered by only a few degrees the pilot has good vision ahead, not only because of the clearing of the nose from his line of vision, but also because the windows of the windshield 12 are more or less perpendicular to his line of vision, and so cause no aberration to his vision.

We claim as our invention:

1. In an airplane capable of high speed flight, a fuselage structure enclosing a pilot's station, and terminating immediately ahead of that station in forwardly facing windows disposed generally transverse to the longitudinal axis of the fuselage structure to afford vision directly forwardly from the pilot's station, but to present a protuberance into the airstream, an elongated nose separate from the fuselage structure, of a shape to constitute with the fuselage structure a substantially uninterrupted streamlined body, masking said windows and shielding such protuberance, when the longitudinal axes of the nose and of the fuselage structure are axially aligned in high speed flight position, means supporting the nose from the fuselage structure for movement between the high speed flight position and a low speed flight position, wherein the longitudinal axis of the nose is lowered relative to the longitudinal axis of the fuselage structure to unmask said windows, and means operable from the pilot's station to effect movement of the nose between the two such positions.

2. An airplane as in claim 1, wherein the means supporting the nose from the fuselage comprises a transverse pivot connection between the same, located well to the rear of the pilot's station, and side cheeks extending rearwardly behind the nose and alongside the fuselage structure to said pivot connection, and of an external shape blending with and included within the substantially uninterrupted streamlined body, when in high speed flight position.

3. A high-speed airplane as in claim 1, including windows in addition to the forwardly facing windows, located in and conforming to the streamlined contour of the fuselage structure adjacent the pilot's station to afford at least lateral and upward vision notwithstanding disposition of the nose in the high speed flight position.

4. A high-speed airplane as in claim 1, including windows in addition to the forwardly facing windows, located in and conforming to the streamlined contour of the fuselage structure alongside the pilot's station to afford lateral and some downward vision, the nose in its high-speed flight position eclipsing said additional windows, and windows in and conforming to the external contour of said nose, complemental to and located to register with the additional windows in the fuselage, when the nose is in the high-speed flight position.

5. In a high-speed airplane, a generally streamlined fuselage structure enclosing a pilot's cabin and a pilot's station therein, and terminating in an abruptly upright forward wall, said wall having transparent windows affording vision directly forwardly from the pilot's station within the cabin, a nose shaped to constitute a smooth forward continuation of and complement to the streamlined shape of the fuselage structure, located principally ahead of said upright forward wall and eclipsing the windows thereof when the nose is in its high-speed flight position, hereinafter described, cheeks rigid with and directed rearwardly from the nose alongside the fuselage structure, and exteriorly blending with and completing the latter's streamlined shape, transverse pivot means located behind the pilot's station supporting said cheeks, and hence the nose, from and for pivotal movement with respect to the fuselage structure, between a high-speed flight position wherein the nose and fuselage structure form a substantially unbroken smooth streamlined body, but wherein the windows are eclipsed, and a low-speed flight position wherein the nose is depressed relative to the fuselage structure, and the windows are uncovered for vision ahead and somewhat downwardly, and means operable from within the pilot's cabin for moving the nose between such two positions.

6. A high-speed airplane as in claim 5, wherein the windowed forward wall of the pilot's cabin is formed as an arcuate surface centered at the pivot axis of the cheeks and nose.

7. A high-speed airplane as in claim 6, wherein the sides of the fuselage structure, inwardly from the cheeks, are formed as surfaces of rotation centered also at the pivot axis of the cheeks and nose.

8. A high-speed airplane as in claim 7 including additional windows located in the sides of the fuselage structure, inwardly of the cheeks and adjacent the pilot's station, which are eclipsed by the cheeks when the nose is in its high-speed flight position, and windows in the streamlined contour of the cheeks, located to register with said additional windows in the sides of the fuselage structure, to afford lateral vision at all times.

References Cited in the file of this patent

UNITED STATES PATENTS

| | | |
|---|---|---|
| 1,718,410 | Cato | June 25, 1929 |
| 1,828,026 | Cline et al. | Oct. 20, 1931 |

FOREIGN PATENTS

| | | |
|---|---|---|
| 413,993 | Great Britain | July 26, 1934 |
| 723,895 | Great Britain | Feb. 16, 1955 |
| 913,498 | Germany | June 14, 1954 |